UNITED STATES PATENT OFFICE.

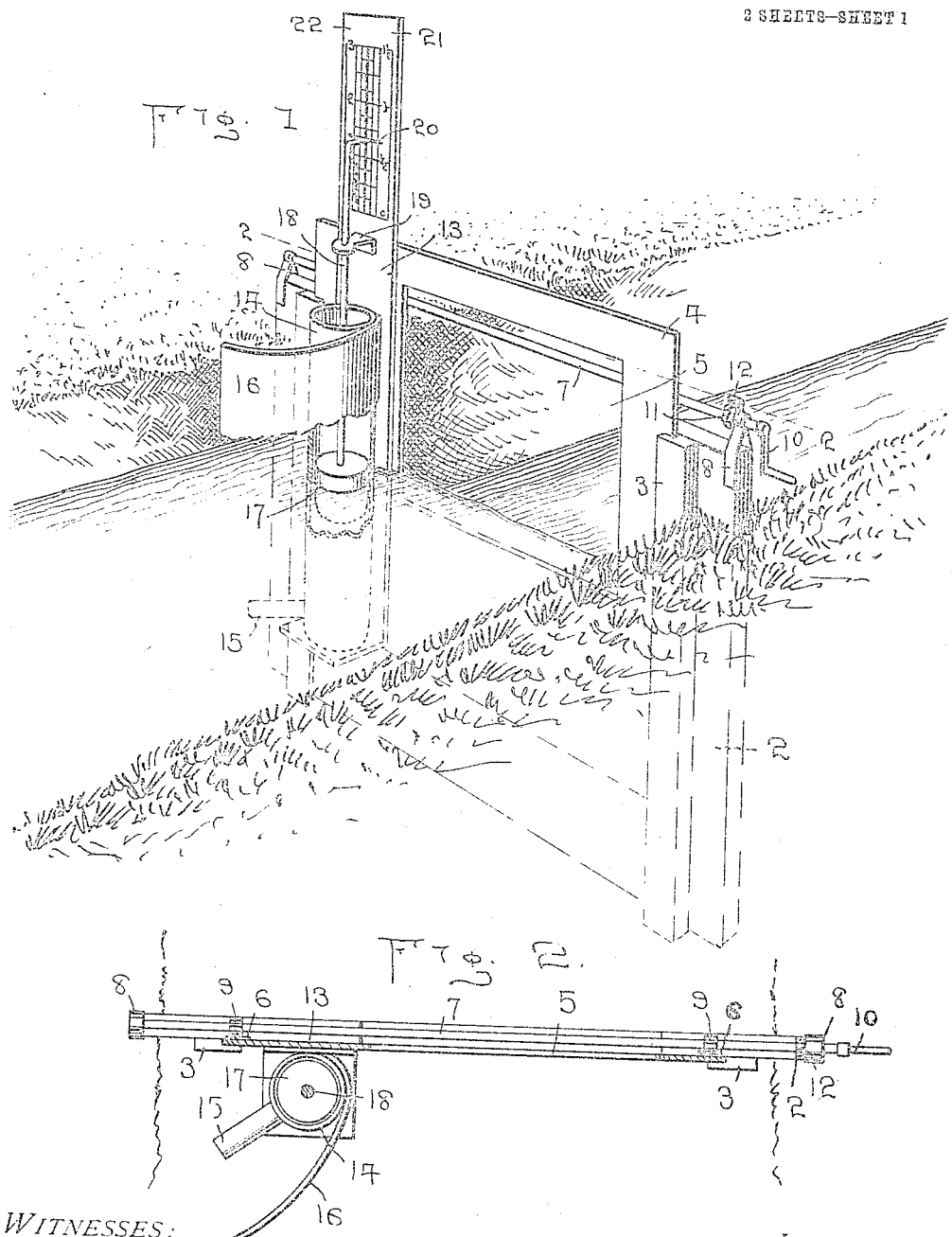

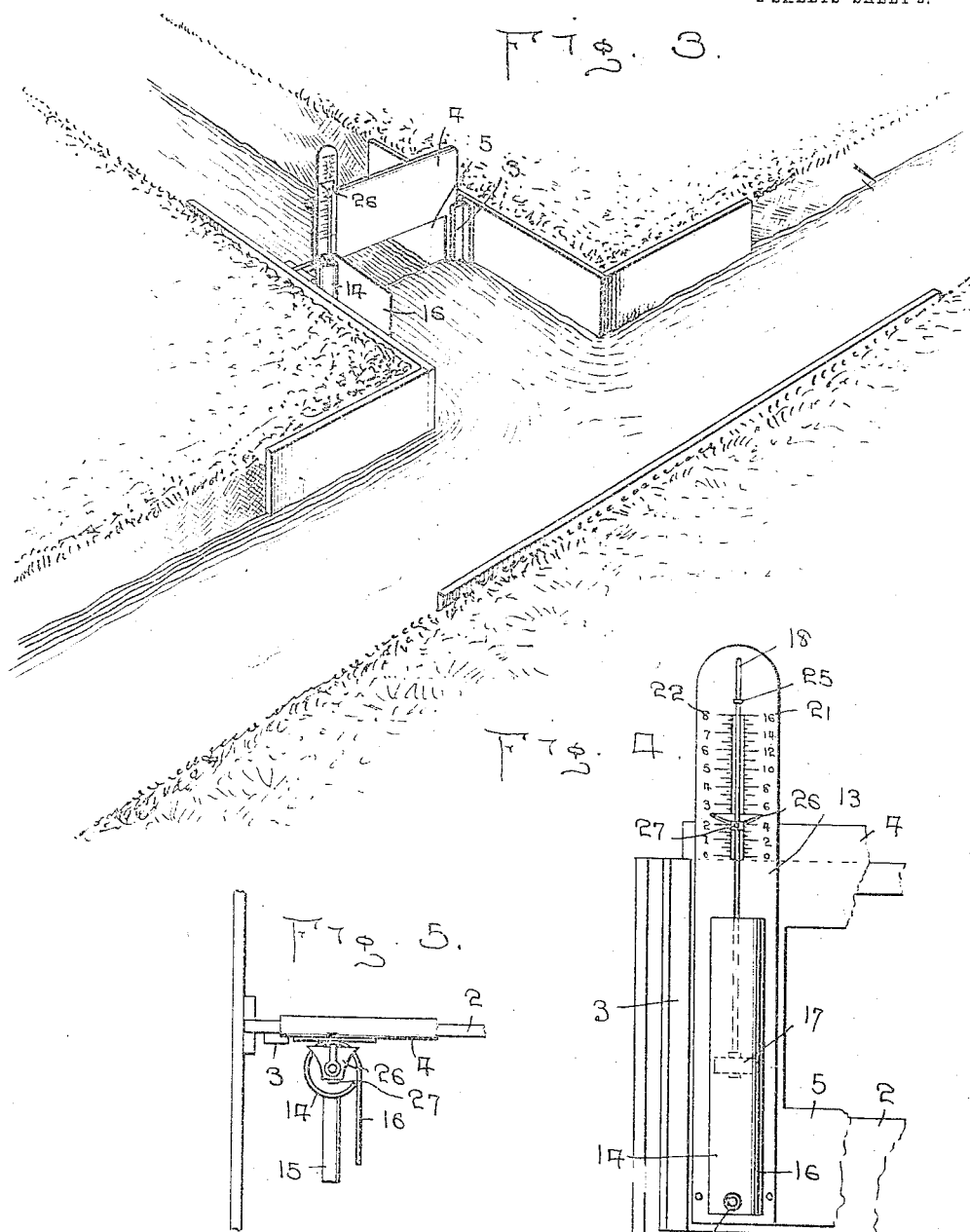

LUTHER C. HUMPHREY, OF JEROME, IDAHO.

WATER GAGE OR METER.

1,056,178.  Specification of Letters Patent.  Patented Mar. 18, 1913.

Application filed April 19, 1912.  Serial No. 691,944.

*To all whom it may concern:*

Be it known that I, LUTHER C. HUMPHREY, a citizen of the United States, residing at Jerome, in the county of Lincoln and State of Idaho, have invented certain new and useful Improvements in Water Gages or Meters; and I do hereby declare the following to be a full, clear, and exact description of the invention, such as will enable others skilled in the art to which it appertains to make and use the same.

My invention relates to new and useful improvements in water gages and more particularly to a gage adapted to be used in irrigation work to show the amount of water passing over a gate or through a ditch.

The object of my invention is to provide a convenient and economical device for measuring and automatically indicating the amount of water passing through an irrigation ditch.

Farming by irrigation is comparatively a new business, but is rapidly assuming vast proportions and many farmers, though ignorant of the science of irrigation, are beginning to develop irrigated farms. The Government has established several experimental farms, where the amount of water necessary to secure the best results for different crops is being determined. It is a common error of inexperienced men to use too much water in irrigation for best crop results. As the experts upon the experimental farms controlled by the Government ascertain the proper quantity of water to use the information is published and it therefore becomes very important that the farmers have a convenient means for measuring the water flowing upon their fields in order to properly make use of the information gained by the experience of the Government experts.

Economy in the use of water is very important in many districts where the water supply is scant and it is desired to serve as large an acreage as possible, and the use of my invention will very materially aid in the economical use of water.

In the accompanying drawings, I have shown the preferred form which my invention may take.

In said drawings, Figure 1 is a perspective view, showing my invention as applied to use in a main or lateral ditch, portions of the device being broken away. Fig. 2 is a horizontal sectional view as seen on line 2—2, Fig. 1. Fig. 3 is a perspective view showing my invention as applied to use in an ordinary division box. Fig. 4 is an elevation showing the preferred form of indicating device, and, Fig. 5 is a top plan view of the device shown in Fig. 4.

Referring to the drawings, in which similar reference numerals designate corresponding parts throughout the several views, 2 is a framework adapted to be placed in an irrigating ditch, said framework having channel strips 3 secured upon one side thereof to form vertical ways for the reception of a vertical movable gate 4.

The gate 4, shown in Figs. 1 and 2, is provided with an opening 5 therein, through which the water in the irrigating ditch is adapted to pass. The gate 4 is provided upon one side with vertically extending racks 6. An operating shaft 7 extends horizontally of the framework and is journaled near its ends in suitable bearings 8. Rigidly secured to said shaft 7 are gears 9, which mesh with the racks 6 and by means of which the gate may be raised or lowered, as desired. In order that the shaft 7 may be rotated, I secure to one end thereof a handle 10. The shaft 7 also has rigidly secured thereon a ratchet 11, which is normally engaged by a pawl 12, secured to one of the brackets 8, said pawl normally preventing rotation of said shaft in one direction. The form of gate just described is particularly desirable for use in main ditches, or large lateral ditches where a considerable flow of water occurs.

The gate 4, shown in Figs. 3, 4 and 5 has an opening 5 therein. This gate is preferably formed of sheet metal which may be stiffened by folding or rolling the upper edge, as shown, and also the lower edge, if desired, the rolled edge also forming a convenient handle for moving the gate up or down in adjusting it to the desired height. This gate, which is preferably of light construction, is used in irrigating ditches where only a small flow of water occurs.

Secured to the gate 4 upon the main ditch side thereof, is the base 13 of my gage. Secured to said base 13 is a float cylinder 14, which is open at its lower end so that the water in the main ditch may rise therein to a height equal to that of the water surrounding said float cylinder. In order that the height of the water in said cylinder may not be affected by the rush of the water from the main ditch when a considerable amount of water is flowing, I preferably connect a pipe 15 to the lower end of the cylinder 14 and extend said pipe a distance up stream. The float cylinder may also be protected from the rush of water by means of a deflector-plate 16.

As shown in Figs. 1 and 2 the deflector plate 16 is formed separately from the cylinder 14 and secured thereto in any desired manner. In Figs. 3 to 5 inclusive, I have shown the cylinder and the deflector plate formed of one piece of material. A float 17 is positioned in the cylinder 14 and is adapted to be supported by the water. It will be understood that the height of the water in the cylinder 14 will be equal to the height of the water surrounding said cylinder and that the height of the float will vary as the level of the water. A rod 18 is secured to the float and extends upwardly therefrom, the upper end of said rod being guided by means of a bracket 19 secured to the base of the gage.

In Fig. 1, I have shown the bracket 19 secured to the base 18 of the gage a short distance above the upper part of the cylinder and the upper end of the rod provided with a horizontally disposed double pointer 20, which is adapted to move over scales 21 and 22.

In Fig. 4, I have shown the upper end of the rod 18 extending through eye-bolt 25 secured to the upper end of the base of the gage. A double pointer 26 is adjustably secured to the rod by means of a set screw 27. When the height of the water is just even with the lower edge of the opening in the meter gate, the double pointer 26 is adjusted upon the rod 18 until it indicates the zero marks upon the scales 21 and 22, and the set screw 27 is then tightened to hold said pointer in place. One of the scales 21 and 22 is preferably so gaged as to show the second feet of water flowing through the gate and the other to show the acre feet or acre inches flowing therethrough in a given time, say every 24 hours.

In Fig. 3, I have shown a form of meter gate or like construction, which is adapted to be disposed in a lateral irrigating ditch. The juncture of the main and lateral ditches is preferably provided with boxes, the framework for the meter gate being secured in the lateral boxes. When it is desired to allow a certain quantity of water to flow into the lateral ditch shown in Fig. 3, or through the main ditch, as shown in Fig. 1, the meter gate is raised or lowered as the case may be until the pointer indicates that the desired quantity is flowing into or through the ditch. Should the height of the water in the main ditch 23 rise above the normal, due to heavy rain or other causes, and it is still desired to allow only a certain quantity of water to flow into the irrigating ditch, it is only necessary to elevate the gate 4 until the pointer indicates that the desired quantity of water is flowing through the gate.

From the foregoing description it will be seen that I have provided a device which will indicate the quantity of water flowing and the quantity which will be distributed upon a field in a definite time. It will further be seen that with my device the quantity of water flowing may be regulated to a greater or less volume, as desired.

While I have shown the preferred form which my invention may take, I desire it to be understood that I may make certain changes therein without departing from the spirit and scope of my invention.

What I claim as new is:

1. In a device of the class described the combination with a frame and a meter gate vertically movable in said frame, said gate having scales thereon, and means for regulating the height of said meter gate; of a float cylinder secured to said meter gate, a float disposed therein, a pointer controlled by the movement of said float, and adapted to be moved over the scales, said pointer being adapted to stand at the zero on said scales when the edge of the meter gate is at the level of the top of the water and to stand at points on the scales to indicate the amount of water flowing over or through the gate when said gate is lowered.

2. In a device of the class described the combination with a water gate having scales associated therewith and means for regulating the height thereof; of a float cylinder secured to said gate and movable therewith, a float in said cylinder adapted to be supported by the water, a scale pointer connected to and controlled by said float, said pointer being adapted to stand at the zero ends of said scales when the gate is at the height of the water and to stand at points on the scales to indicate the amount of water passing over or through the gate when the water is above said gate.

In testimony whereof I have signed my name to this specification in the presence of two subscribing witnesses.

LUTHER C. HUMPHREY.

Witnesses:
J. L. QUICK,
R. C. ESTEP.